May 31, 1938.  A. LOTT  2,119,170
VEGETABLE WASHING APPARATUS
Filed Dec. 28, 1936  2 Sheets-Sheet 1
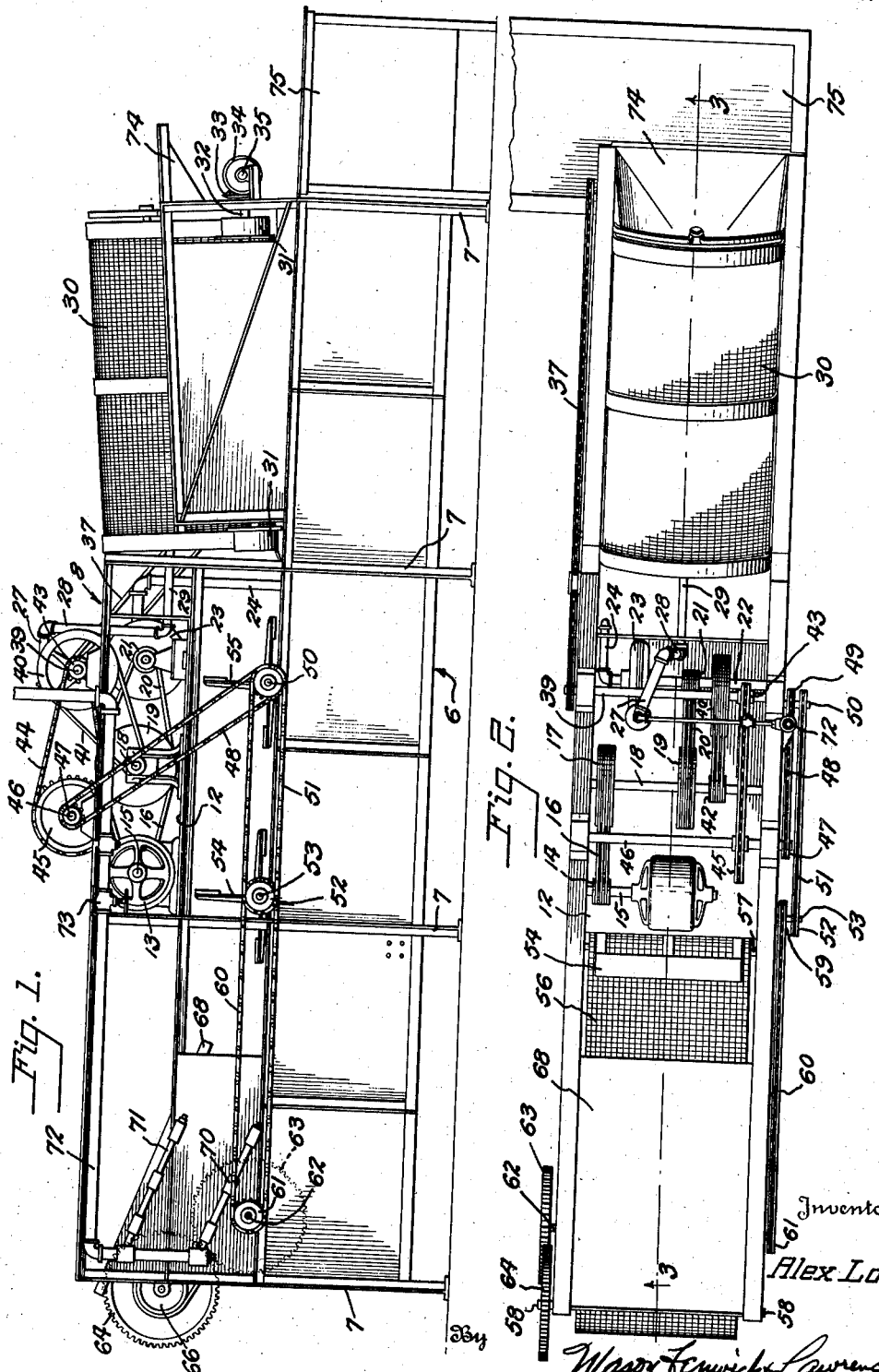
Inventor
Alex Lott
By Mason Fenwick & Lawrence
Attorneys

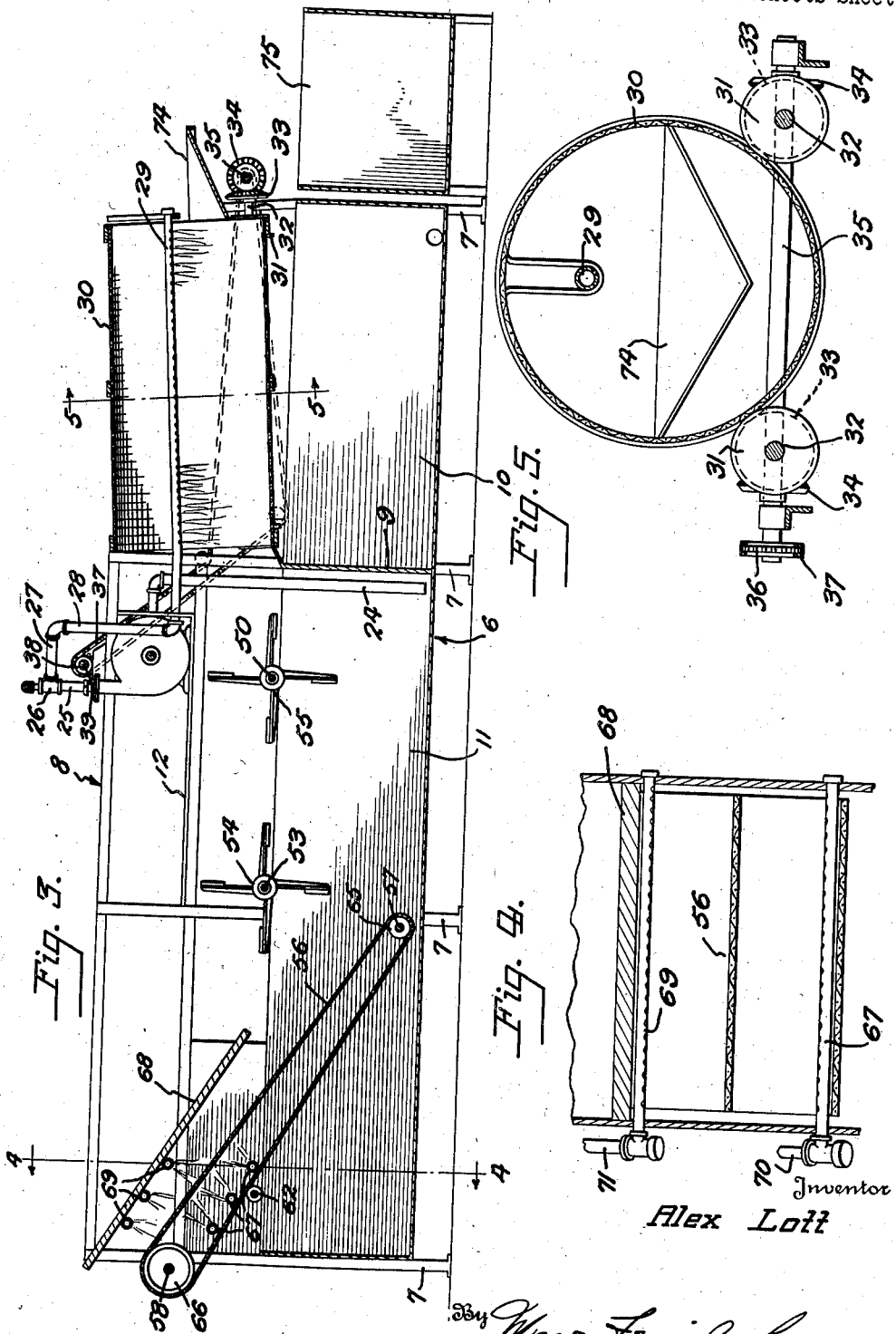

Patented May 31, 1938

2,119,170

UNITED STATES PATENT OFFICE 2,119,170

VEGETABLE WASHING APPARATUS

Alex Lott, Orange, Tex.

Application December 28, 1936, Serial No. 118,000

4 Claims. (Cl. 146—197)

The invention forming the subject matter of this application relates to apparatus for washing vegetables; and particularly for washing vegetables such as spinach, turnip greens and mustard greens.

The main object of the invention is to provide a vegetable washing apparatus of the character described in which the water used for a final washing of the vegetables may be utilized to effect a preliminary washing, thereby effecting a considerable saving in the cost of operation.

Other objects of the invention will become apparent as the detailed description thereof proceeds.

In the drawings:

Figure 1 is a side elevation of the vegetable washing machine;

Figure 2 is a top plan of the machine shown in Figure 1;

Figure 3 is a central vertical section taken on the line 3—3 of Figure 2;

Figure 4 is a vertical transverse section to an enlarged scale, taken on the line 4—4 of Figure 3; and Figure 5 is a vertical transverse section taken on the line 5—5 of Figure 3.

Referring to the drawings, in which similar parts are designated by like numerals:

The washing apparatus comprises a long tank 6 supported by standards 7 spaced apart to form the upright members of framework 8 which supports the motor and other operating mechanism for the apparatus. The tank 6 is divided by a partition 9 into chambers 10 and 11. A supporting plate 12 extends across the framework 8 to support a motor 13. A pulley 14 mounted on the rotor shaft 15 of the motor 13, is connected by belting 16 to a larger pulley 17 secured to a shaft 18 which is journaled at its opposite end in bearings supported by the framework 8. A pulley 19 secured to the countershaft 18 is connected by a belt 20 to a smaller pulley 21 suitably fixed to a shaft 22, suitably journaled at its opposite ends in the framework and forming a means for operating the pump 23.

The pump 23 has its inlet end connected to a pipe 24 which extends downwardly into the chamber 11 and terminates a short distance from the bottom thereof. The outlet end of the pump is connected by a pipe 25, T-fitting 26 and pipes 27 and 28, to a spray pipe 29 extending lengthwise through a rotary screen or drum 30. The drum 30 is mounted to rotate about an axis slightly inclined to the horizontal; and is supported and rotated by flanged rollers 31 suitably secured to shafts 32 journaled in the framework above the chamber 10.

The flanged rollers 31 are rotated by means of beveled gears 33 fixed to the projecting ends of the shaft 32. The beveled gears 33 are connected for rotation by beveled gears 34 which are fixed to a transverse shaft 35, suitably journaled at its opposite ends in the framework. The shaft 35 is rotated by means of a sprocket 36 fixed to one end thereof and connected by a sprocket chain 37 to a sprocket 38 which is fixed to a shaft 39 journaled at its opposite ends in the framework. Rotation of the shaft 39 is effected by means of a pulley 40 fixed to said shaft 39 and connected by a belt 41 to a pulley 42 fixed to the countershaft 18 operated by its connections to the motor 13.

A sprocket 43 is fixed to the shaft 39 and is connected by a sprocket chain 44 to a sprocket 45 fixed to the shaft 46 which is suitably journaled at its opposite ends in the framework. The shaft 46 projects laterally from the framework; and at its projecting end is provided with a sprocket 47 connected by a sprocket chain 48 to a sprocket 49 which is fixed to a beater shaft 50 journaled at its opposite ends in the supporting framework. The sprocket 49 is connected by a sprocket chain 51 to a sprocket 52, which is fixed to a shaft 53 suitably journaled at its opposite ends in the framework and carrying a beater 54 operating within the chamber 11. A beater 55 is suitably secured to the beater shaft 50. These two beaters operate in a direction adapted to feed the material being washed, through the chamber 11 and onto the upper branch of a screen conveyor 56.

The screen conveyor 56 is mounted in the chamber 11 and on the framework 8 by means of the parallel shafts 57 and 58. To operate the screen conveyor 56 the shaft 53 has fixed thereto a sprocket 59, connected by a sprocket chain 60 to a sprocket 61 fixed to one end of a shaft 62 extending across and journaled in the framework 8. A gear 63 fixed to the shaft 62 meshes with the gear 64 fixed on the end of the shaft 58. Rollers 65 and 66 secured to the shafts 57 and 58, respectively, serve to support the branches of the screen conveyor 56 properly spaced apart to accommodate a series of spray pipes 67 in position for discharging a cleansing spray of water upwardly against the upper branch of the conveyor 56. These structural details may be readily varied to suit the dimensions of the machine, and form no essential parts of the invention.

The apparatus is provided above the upper branch of the screen conveyor 56, with a splash plate 68, below which the spray pipes 69 are arranged to spray cleansing liquid downwardly upon the vegetables supported by the upper branch of the conveyor. The spray pipes 67 and 69 are connected to manifolds 70 and 71 which, in turn, are connected to a source of supply of water under pressure conducted through piping 72 under the control of a valve 73.

The rotary screen 30 is open at its opposite ends. At its inlet end there is provided a hopper 74, which is supported by the framework directly above a wash tank 75 adapted to contain water for giving a preliminary cleansing to the vegetables before placing them into the hopper 74.

In the operation of this apparatus, the spinach or other vegetable is given a preliminary washing in the tank 75 to loosen the dirt and other matter. The vegetables thus washed are dumped into the hopper 74 which drops them onto the rotating screen 30. Due to the inclination of the screen, the vegetables are fed downwardly under the spray 29 into the tank 11. The beaters 55 and 54 feed the vegetables through the comparatively clean water in the tank 11 onto the endless screen conveyor 56. As the vegetables move upwardly on the conveyor 56, the final sprays of clean water forced through the spray pipes 67 and 69 complete the cleaning operation. The vegetables thus cleaned are then removed from the upper end of the conveyor 56.

It will be noted that the water resulting from the spraying operation through the spray pipes 67 and 69, is comparatively clean and is, therefore, available in the tank 11 to be pumped therefrom and passed through the spray pipe 29 where it is used to effect what may be termed a first cleaning operation. The waste from the spray pipe 29 is trapped in the tank 10 and directed by any suitable means wherever desired.

Numerous variations may doubtless be devised by persons skilled in the art without departing from the principles of my invention. I, therefore, desire no limitations to be imposed on my invention, except such as are indicated in the appended claims.

What I claim is:

1. In a vegetable washing apparatus, supporting framework, a tank adapted to contain cleansing water, a perforated drum mounted to rotate on said framework and inclined to feed vegetables therethrough into one end of said tank, an endless screen conveyor of substantially the same width as said tank and extending into and across said tank at the other end, to remove vegetables therefrom, means on opposite sides of one branch of said conveyor and connected to a source of water under pressure to direct water in opposite directions through said branch, and means for forcing water from said tank at the end adjacent the perforated drum, onto the vegetables passing through said perforated drum.

2. In a vegetable washing apparatus, supporting framework, a tank adapted to contain cleansing water, a perforated drum mounted to rotate on said framework and inclined to feed vegetables therethrough into one end of said tank, an endless screen conveyor of substantially the same width as said tank and extending into and across said tank to remove vegetables from the other end therefrom, means on opposite sides of one branch of said conveyor and connected to a source of water under pressure to direct water in opposite directions through said branch, means for forcing water from the end of said tank onto the vegetables passing through said perforated drum, and beater mechanism movable in said tank for feeding vegetables from the inlet end thereof onto said endless conveyor.

3. In a vegetable washing apparatus, supporting framework, a tank, a perforated drum mounted above, beyond and at one end of the tank to rotate about an axis inclined to the horizontal to feed vegetables into that end of said tank, an endless conveyor extending into said tank from the other end thereof, means connected to a source of water under pressure for spraying liquid onto the opposite sides of one branch of said conveyor, a spray extending through said drum substantially parallel with the axis thereof, and means for drawing water from the end of said tank adjacent the drum and forcing it through said spray in the drum.

4. In a vegetable washing apparatus, a tank having a transverse partition, a perforated drum mounted above the tank at one side of said partition to rotate about an axis inclined to the horizontal to feed vegetables into said tank over said partition, an endless screen conveyor extending into said tank from the other end thereof, means connected to a source of water under pressure for directing sprays in opposite directions through one branch of said conveyor, a spray pipe extending through said drum substantially parallel with the axis thereof, a pipe extending downwardly into said tank adjacent the partition and on the side thereof opposite the drum, and a pump interposed between said pipes to draw water from said tank and force it through said spray pipe onto vegetables passing through said perforated drum.

ALEX LOTT.